US005442749A

United States Patent [19]

Northcutt et al.

[11] Patent Number: 5,442,749
[45] Date of Patent: Aug. 15, 1995

[54] NETWORK VIDEO SERVER SYSTEM RECEIVING REQUESTS FROM CLIENTS FOR SPECIFIC FORMATTED DATA THROUGH A DEFAULT CHANNEL AND ESTABLISHING COMMUNICATION THROUGH SEPARATE CONTROL AND DATA CHANNELS

[75] Inventors: J. Duane Northcutt; David T. Berry, both of Sunnyvale, Calif.

[73] Assignee: Sun Microsystems, Inc., Mountain View, Calif.

[21] Appl. No.: 89,420

[22] Filed: Jul. 9, 1993

Related U.S. Application Data

[63] Continuation of Ser. No. 748,792, Aug. 22, 1991, abandoned.

[51] Int. Cl.[6] .................. G06F 13/42; G06F 15/62; G06F 13/14
[52] U.S. Cl. .................. 395/200.09; 395/500; 395/200.15; 395/200.18; 395/650; 395/474; 364/230.4; 364/228.4; 364/242.95; 364/DIG. 1
[58] Field of Search ............... 395/100, 111, 117, 118, 395/153, 154, 162, 200, 500; 341/3, 12, 175; 364/146

[56] References Cited

U.S. PATENT DOCUMENTS

| | | | |
|---|---|---|---|
| 4,907,146 | 3/1990 | Caporali | 364/132 |
| 4,949,248 | 8/1990 | Caro | 364/200 |
| 4,974,254 | 11/1990 | Perine | 379/100 |
| 5,003,532 | 3/1991 | Ashida et al. | 370/62 |
| 5,008,926 | 4/1991 | Misholi | 379/89 |
| 5,014,267 | 5/1991 | Tompkins et al. | 370/62 |
| 5,091,849 | 2/1992 | Davis et al. | 395/100 |
| 5,128,878 | 12/1992 | Gore et al. | 395/162 |
| 5,132,992 | 7/1992 | Yurt et al. | 375/122 |

FOREIGN PATENT DOCUMENTS

| | | |
|---|---|---|
| 3921617A1 | 6/1989 | Germany . |
| 0188828 | 8/1985 | Netherlands ............ 15/62 |

OTHER PUBLICATIONS

Patent Abstracts of Japan, vol. 6, No. 264 (E-150) (1142) 23 Dec. 1982 and JP-A-57 159 188 (Hitachi) 27 Mar. 1981 [Abstract].

*Primary Examiner*—Thomas C. Lee
*Assistant Examiner*—Sang Hui Kim
*Attorney, Agent, or Firm*—Blakely Sokoloff Taylor & Zafman

[57] ABSTRACT

A network video server apparatus and method for transferring video image data across a computer network serving multiple clients. The network server apparatus comprises two parts, a server and a client. The server is run on a computer system containing a video digitizer hardware. Running the server on this computer system makes it possible to distribute video images across an existing network linking several client computer systems. The client provides the user with a means of viewing the images generated by the server through the network, controlling the size and type of image to be sent by the server, controlling the underlying video digitizer hardware, and collecting statistics about the server/client performance. The client software is designed to appear to the users as if they were operating the client software locally. The server and client communicate with each other over two channels: one for control information and another for video data. Data transfer from a server to a client is asynchronous such that the server need not wait for a client to complete its receipt before servicing the next client.

10 Claims, 8 Drawing Sheets

NETWORK VIDEO SERVER SYSTEM RECEIVING REQUESTS FROM CLIENTS FOR SPECIFIC FORMATTED DATA THROUGH A DEFAULT CHANNEL AND ESTABLISHING COMMUNICATION THROUGH SEPARATE CONTROL AND DATA CHANNELS

This is a continuation of application Ser. No. 07/748,792 filed Aug. 22, 1991 now abandoned.

BACKGROUND OF THE INVENTION

1. Field of the Invention

The present invention relates to transferring data across a computer network, and more particularly, to transferring video image data from a computer running a server process through a computer network to multiple computers running a client process on an independent basis.

2. Art Background

With the advent of computer and video technologies, it is more and more common to integrate video images into a computer system, such as a workstation or a desktop personal computer, for uses in desktop publishing and multimedia application. Such a system typically consists of a computer with a high performance central processing unit (CPU), a high resolution display system, a video processor, high capacity memory and a video digitizer. The captured video image source may come from a video digitizer, a video frame grabber, or a video encoder/decoder. In a low end video application, a digitizer allows a user to import images from a video camera or VCR, and display or save the images on a computer. A limitation of the digitizer entry is that it usually requires several seconds to capture an image, which makes working with moving subjects, or continuous images, impracticable, In a higher end of technology, a video frame grabber allows a user to capture a single video frame in about 1/30 of a second thus providing much higher bandwidth in video capturing. The captured video frame is converted into digital format suitable for the computer's processor. With the proliferation of computer network systems, it becomes quite common and desirable for individual computers to transfer and receive video images across a network.

An example of a video acquisition device is the VideoPix ™ card, manufactured by Sun Microsystems, Inc., Mountain View, Calif., which allows users to capture, manipulate, store, and share images. Particularly, when a video digitizer card is connected to a SPARCstation ™ system, a user can easily capture 8- or 24-bit color or grayscale images and integrate the images into applications such as desktop publishing or multimedia electronic mail.

In an environment of networked computers and peripherals, it is common to pool peripherals, such as I/O devices, printers and offline memory storage for use by each networked computer. In such case, the peripheral called on is referred to as a server and the calling computer is referred to as the client. Also, it is common for a computer to act as a server for other clients when data in the server needs to be accessed by the clients. In computer network parlance, a "server" is a piece of software and/or hardware through which network services are implemented. A "network service" is a collection of one of more remote programs. Usually, a remote program implements one or more remote procedures; the procedures, their parameters, and results are documented in the specific program's protocol specification. In order to access services through the network, network clients issue remote procedure calls (RPC) to initiate the services. A server may support more than one version of a remote program in order to be forward compatible with changing protocols. For example, a network file service may be composed of two programs. One program may deal with high-level applications such as file system access control and locking. The other may deal with low-level file I/O and have procedures such as "read" and "write." A client of the network file service would call the procedures associated with the two programs of the service on behalf of a user on the client computer.

The remote procedure call (RPC) model used by the client to access the server across the network is similar to the local procedure call model. In the local procedure call model, the client caller places arguments to a procedure in some well-specified location (such as a result register). The client then transfers control to the procedure, and eventually gains back control. At that point, the results of the procedure are extracted from the well-specified location, and the caller continues execution. Referring to FIG. 1, the RPC is similar in that one thread of control logically winds through two processes—one is the callers process, the other is the servers process. That is, the caller process sends a call message to the server process and waits for a reply message. The call message contains the procedure's results, among other things. Once the reply message is received, the results of the procedure are extracted, and the client callers own operation is resumed. On the server side, a process is dormant awaiting the arrival of a call message. When one arrives, the server process extracts the procedure's parameters, executes the procedure requested, sends a reply message, including the results of executing the procedure. Note that in this illustrative RPC model, only one of the processes is active at any given time. However, the RPC protocol makes no restrictions on the concurrency model implemented, and others are possible. For example, an implementation may choose to have RPC calls be asynchronous so that the client may perform useful work while waiting for the reply from the server. Another possibility is to have the server create a task to process an incoming request, so that the server can be free to receive other requests. For more discussion on RPC's, see, for example, *Network Programming,* available from Sun Microsystems, Inc., Mountain View, Calif.

When the server needs to transfer large quantities of continuous data to clients across a computer network, as in the case of broadcasting video image data from the server to clients across the network, the command/response-oriented RPC has its limitations. First of all, digital video data is grabbed from the video data source and continuously transferred across the network to any computer accessing the server, as opposed to data in discrete data files transferred by RPC's. In a network environment, it is also desirable to have optimization processing to achieve efficiency—an area in which the RPC is deficient. The point-to-point communication created by the RPC cannot not allow sharing of network resources among the multiple clients across the network. For example, if another client makes the same request as the previous client, e.g. requesting the same frame of video data by the same format, separate RPCs cannot provide for caching the already formatted data to save processing time. Further, the traditional RPC model cannot support multiple clients each communicating with the server on an independent basis, which enables each client to receive data in its desired format irrespective of other clients' desired formats.

The present invention provides for a network video server for transferring video image data across a computer network to a plurality of clients, where each client can communicate with the server independently, and efficiently. As described, the present invention also achieves optimization by allowing network resources to be shared concurrently among multiple clients.

SUMMARY OF THE INVENTION

Therefore, it is an object of the present invention to efficiently transfer video image data across a networked computer environment.

It is also an object of the present invention to allow networked computer stations to share captured video image data with minimum degradation of network performance and without the cost of private video capture hardware.

It is also an object of the present invention to provide the network server with the ability to support multiple clients of the video service, across the network, independently.

The network video server incorporating the presently claimed invention comprises two parts, a server and a client. The server process is run on a computer system coupled to a video digitizer. The video digitizer accepts video data as its input and provides digital data representative of an analog frame of video data as its output to the computer. By running the server process with the computer system it is possible to distribute digital video images produced by the video digitizer across an existing network to several computer systems running instances of the client process. The client process provides the user with a means of viewing the images generated by the video digitizer through the network, controlling the size and type of image to be sent by the server process, controlling the underlying video digitizer, and collecting statistics about the server/client performance.

A multiple channel communication system between the server and the clients provides the bandwidth needed to effectively transfer the digital video data. The server and each client communicate through two channels: one for control information and another for video data. Data transfer from the server to the client is asynchronous such that the server need not wait for a client to complete receipt of the video data before servicing the next client, thus providing the capability for a single video digitizer to service multiple clients concurrently.

BRIEF DESCRIPTION OF THE DRAWINGS

The objects, features and advantages of the present invention will be apparent from the following detailed description in which.

DESCRIPTION OF THE INVENTION

1. Notation And Nomenclature

Figure 1:
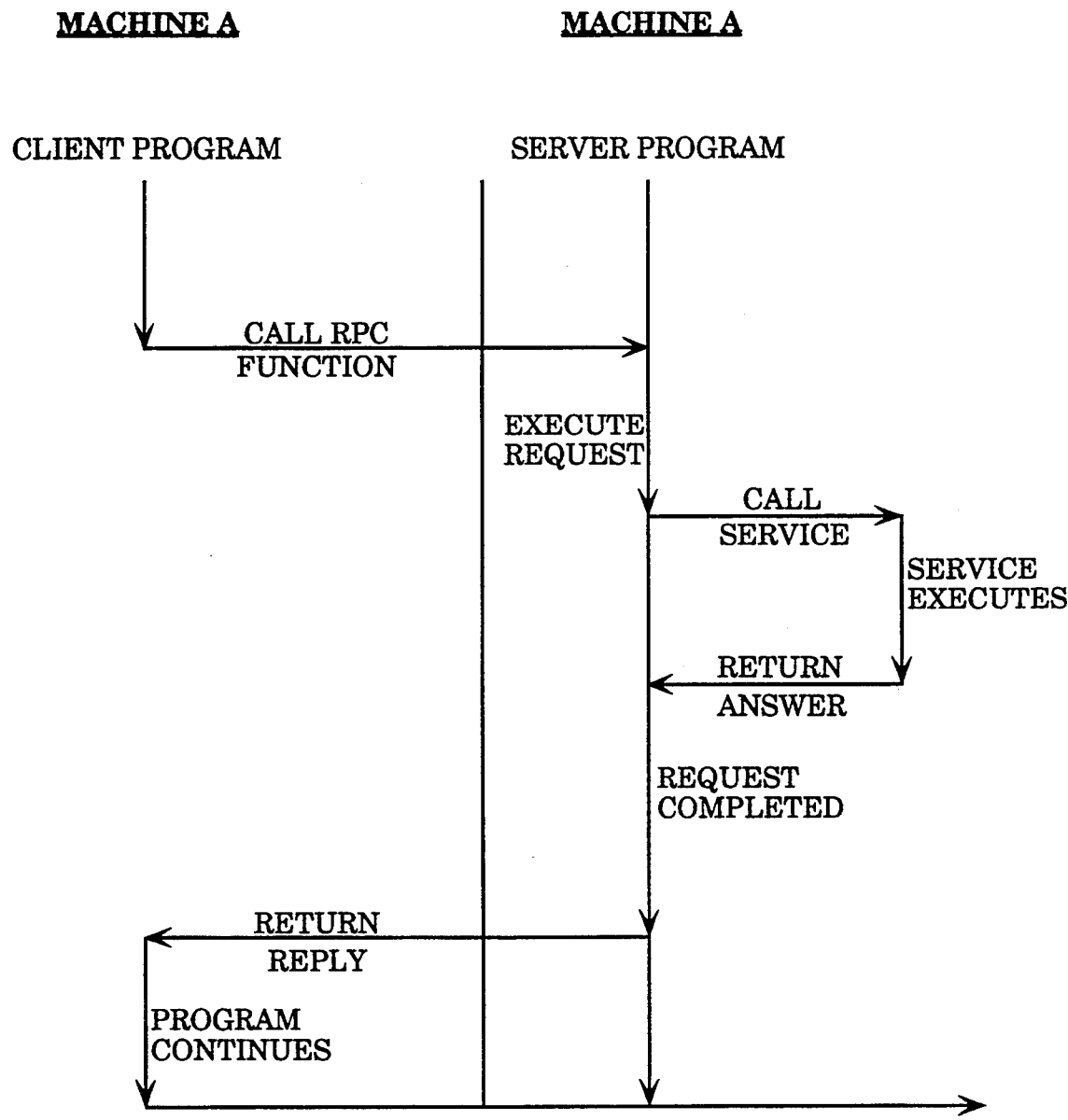
FIG. 1 is a diagram illustrating a Remote Procedural Call paradigm in the prior art.

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

2. Coding Details

No particular programming language has been indicated for carrying out the various procedures described herein. This is in part due to the fact that not all languages that might be mentioned are universally available. Each user of a particular computer will be aware of a language which is most suitable for his immediate purposes. In practice, it has proven useful to substantially implement the present invention in an assembly language which provides a machine executable object code. Because the computers and the monitor systems which may be used in practicing the instant invention consist of many diverse elements, no detailed program listing has been provided. It is considered that the operations and other procedures described herein and illustrated in the accompanying drawings are sufficiently disclosed to permit one of ordinary skill to practice the instant invention.

3. General Description

Figure 2:
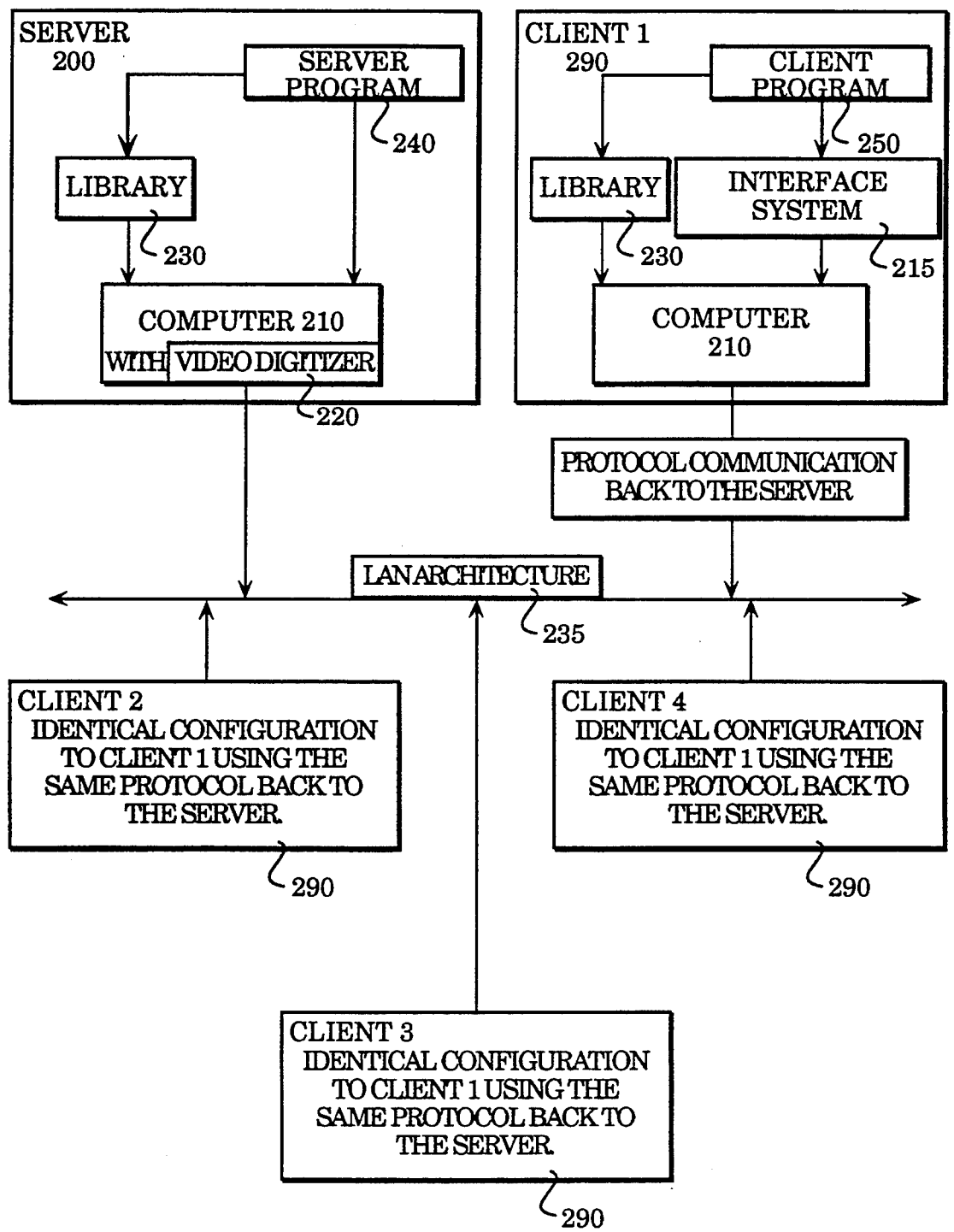
FIG. 2 is a block diagram representation of the presently preferred embodiment.
Figure 9:
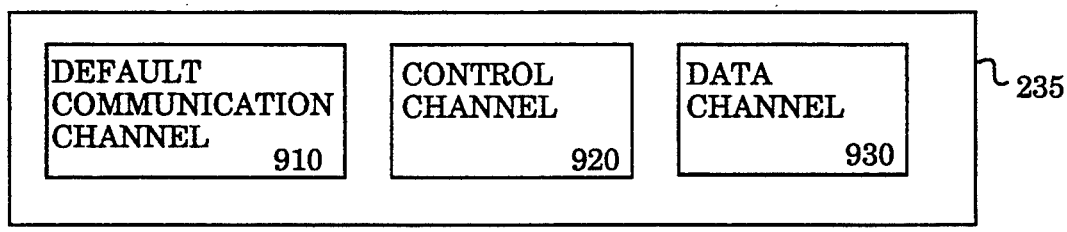
FIG. 9 is a block diagram illustrating the LAN architecture 235 of FIG. 2.

The following general system description discloses the current configuration in conjunction with the presently claimed invention. However, it will be apparent to those skilled in the art that the presently claimed invention can be practiced without the specifics of the current configuration. As such, the general system described hereinafter is for illustration purposes only. Also, although the description makes references to the Unix ® operating system and channel utilities, it will be apparent to those skilled in the art that any other operating systems with utilities similar to the point-to-point network channel communication can be used to achieve the desired functionality of the presently claimed invention. FIG. 2 illustrates the general system. The server process 240 is run on a computer 210a containing the video digitizer 220. The server 200 and clients 290 are networked through a local area network 235. FIG. 9 is a block diagram illustrating a default communication channel 910, a control channel 920, and a data channel 930 of the LAN architecture 235 of FIG. 2. The interface system 215 of client 1 290 controls the display and execution of processes and controls the display of images on the computer 210b running the client process 250. It will be obvious to one of ordinary skill in the art that computers 210a and 210b may be the same type of computers or different types of computers. The primary difference between computers 210a and 210b is that computer 210a contains the video digitizer 220 and computer 210b does not. The video digitizer 220 provides the computer system 210 with the capability to digitize images from composite video signals. The video digitizer 220 decodes the composite video signal into digital data representing various luminance and chrominance components.

A library 230 is used in conjunction with computers 210a and 210b to process digital video data and to provide users with utilities to convert the decoded image data into formats and sizes suitable for image display on computers 210a and 210b. The video digitizer 220 currently is capable of supplying the user with digital color images in YUV format. The library 230 currently converts the YUV data into such formats as 24-bit color BGR, 8-bit color and 7-bit grayscale data. Additionally, images can be saved as 24-bit files, 8-bit color, 7-bit gray scale and 1-bit monochrome.

A method and apparatus for transferring digital video data across a computer network between a server and a plurality of clients is disclosed. When the server process is initialized, it establishes connection with a video digitizer as its input source. After the server establishes a first communication channel for the initial communication with the clients, the server enters into a dormant state awaiting linking requests from the clients.

A client connects to the server by transmitting an initial linking request to the server through an initial, well-known, communication channel. Upon receiving the linking request, the server establishes a new control channel with the client and sends the channel identification to the client through the new control channel. Upon receiving the identification from the server, the client establishes a data channel with the server and sends the channel identification to the server through the data channel. The server then clears the data channel and sends an acknowledgement to the client through the control channel. The server and client are synchronized when the client receives the acknowledgement from the server.

In sending digital video image data to a single client connected to the network, the server grabs images directly from the video digitizer and writes directly to the client across the network. In a case with multiple clients requesting various formats of data, the server grabs the image from the video digitizer and stores it in a local memory, from which it can derive various formats through the library before writing to each client. Image buffers are set up by the server to store already derived formats so that if another client requests the same format of image, the server can prepare the data for the requested format because it is already available in the image buffer, thus avoiding delay and minimizing duplicate hardware activity. Furthermore, because of the multiple channel communication, the write from the server to each client can be asynchronous so that the server can attend to other clients before a write to one client is completed, thus optimizing the write operation.

Reference is now made to FIG. 2. The network video server employing the presently claimed invention comprises two parts, a server 200 and a client 290. The server process 240 is run on a computer 210 containing the video digitizer 220. By running the server 240 on the computer 210, digital video images can be distributed across an existing network. The client 290 provides the user of computer 210a with means of viewing the images transferred from the server 200, controlling the size and type of image that the server 200 sends to it, controlling the underlying video digitizer 220, and collecting statistics about the server/client performance. Once the client 290 is connected to the server 200, the client program 250 operates from the user's perspective as if the digitizer hardware was coupled locally to the client 290.

The server and client communicate with each other through two communication channels. One for control information and another for video data. Commands are communicated over the control channel. The data channel is used for sending image data. Having two separate channels for commands and video data provides for increased data transfer capabilities, particularly when video image data are to be transferred in high volume and in high speed. The use of two channels also helps prevent race conditions from occurring between the server and client. Currently, TCP (Transmission Control Protocol) channels are used by the server to communicate with each client because of TCP's accuracy and reliability in data transfer. Commands from the client to the server are in the format given in two types of structures, one for the initial connection to the server and one for all other commands. The initial command is different in that it passes the client users log-in name to the server so that it can be sent to the other clients by the server.

An example of a command is a PREVIEW mode (SET_VIDEO_MODE) setting the various sizes, color and grayscale. For the PREVIEW mode, there is no data associated with the command. However, if the command were to SWITCH video-in ports, since the video digitizer hardware may have multiple video-in ports, then the number of the port would be the data associated with the command. The following are a list of current commands which may be used in the preferred embodiment of the present invention.

TABLE 1

| Command | Function |
| --- | --- |
| CONNECT | Connect a new client to the server. |
| SHUTDOWN | Shutdown the server. |
| DISCONNECT | Disconnect a client from the server. |
| GET_FRAMEINFO | Get information about the video frame. |
| GET_STATUS | Get status information from the server. |
| SET/GET_MODE | Set/get the current mode of the video stream. |
| STREAM_START | Start the video stream flow from the server to the client. |
| STREAM_STOP | Stop the video stream flow. |
| GET_CLIP | Get a clip of N frames of video. |
| SET/GET_HW | Get/set the current value of the current server hardware. |

After each command has been sent to the server the client awaits a response. The response received varies from command to command. The response from the server is also defined as a C data structure although it only contains one element. This provides expandability without major programming effort.

Figure 3:
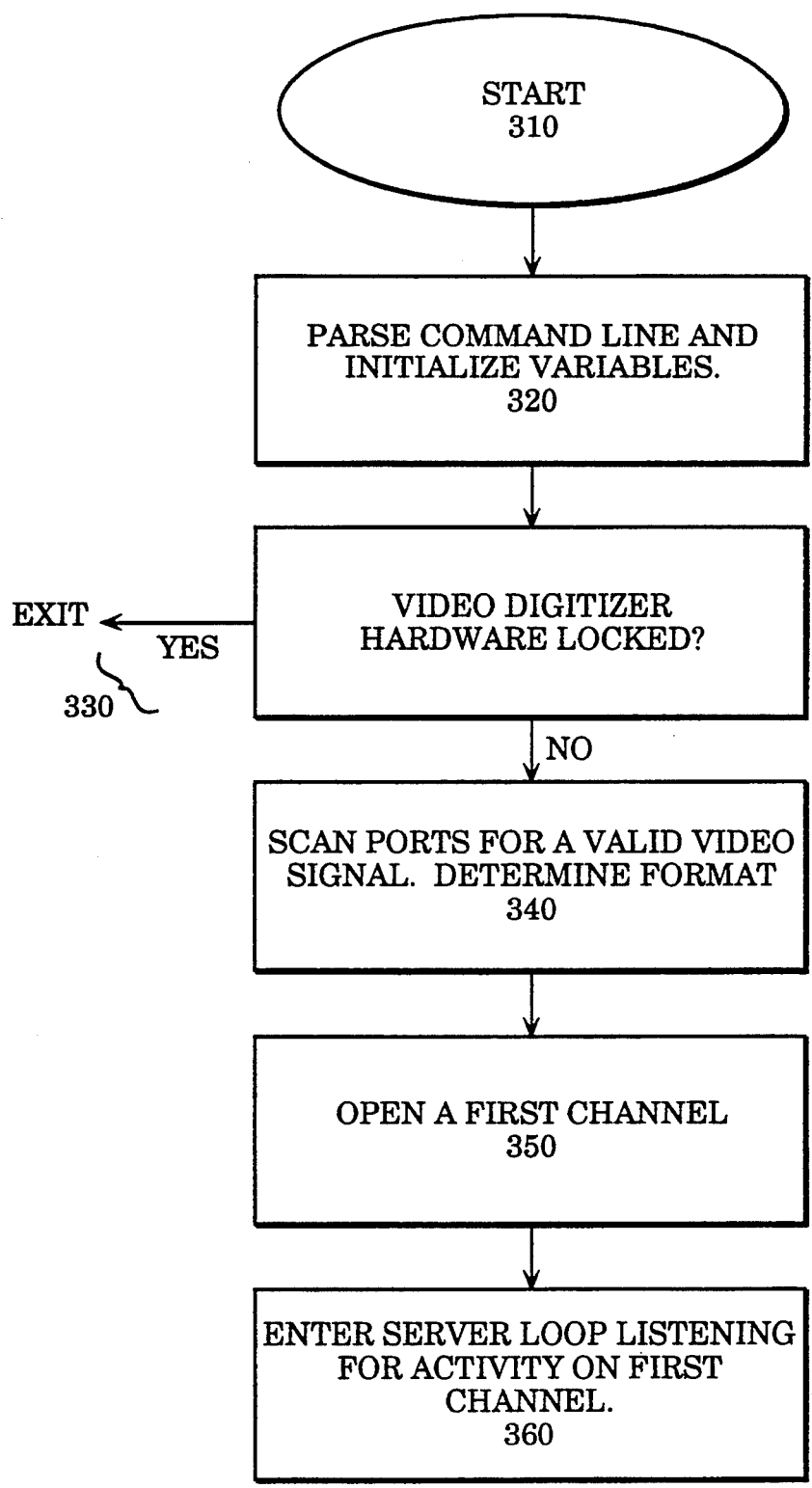
FIG. 3 is a flow chart illustrating the server initialization process.

Reference is now made to FIG. 3, where the process for video server initialization is diagrammed. Currently the video server is started at the UNIX® shell command line by entering the name of the server program. Although the server process is initiated by the user as shown in FIG. 3, it will be obvious to those skilled in the art that other process initiations are also available. Once started 310, after initialization of variables and parsing the command line 320 by the server, the video digitizer device is opened for reading by the server. Currently, if another process, such as an application, has already opened the video digitizer hardware, access to the digitizer hardware through the server will be refused and the program will terminate 330. However, it should be apparent to those skilled in the art that the video digitizer hardware can be a non-exclusive device to accommodate concurrent accessing by various processes. If the digitizer is opened successfully the video-in ports are interrogated for the presence of a valid video signal by the server. On the first port with a valid video signal the scanning is aborted and that port is used as the input video source. The format of the video signal is determined (NTSC or PAL) and the digitizer is set up according to the format 340.

Figure 5:
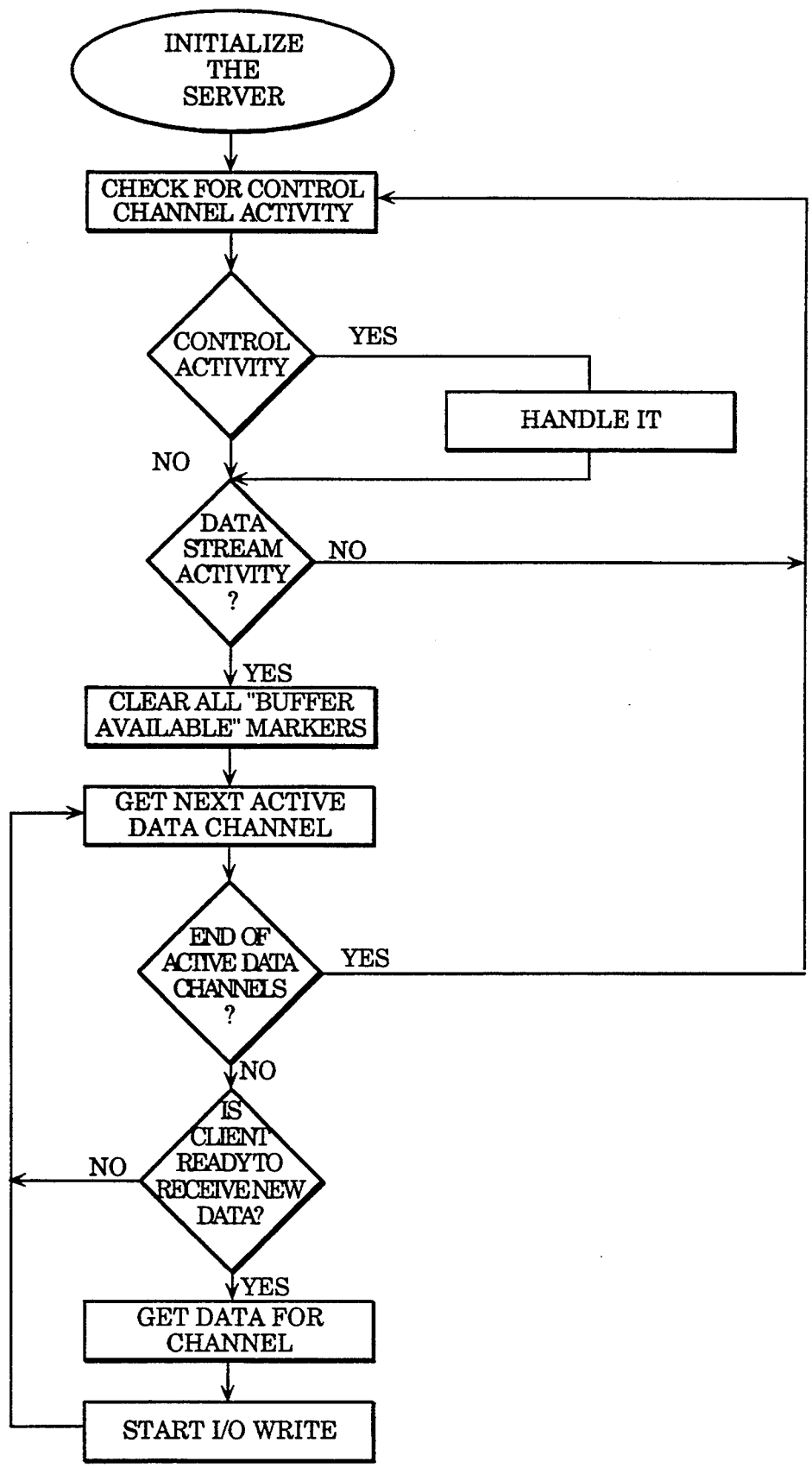
FIG. 5 is a flow chart diagramming the main loop of the Network Video Server.

After the video digitizer is opened, the network connections are established. A first channel, serving as a default channel, is opened for initialization before the server enters into a loop awaiting activity on the first channel 360 as will be described in connection with FIG. 5. Under the current UNIX® system, processes communicate using the client-server model: a server process listens to a channel, one end point of a two-way communications path, and client processes communicate to the server process through another channel, the other end point of the communications path. For those clients wishing to establish a connection with the server, communication is initially through the default channel, as this default channel is well-known to all the clients throughout the network. For further discussion on the channel mechanism, see, for example, *The Design of the UNIX® Operating System* by Maurice J. Bach, published by Prentice-Hall, Inc.

Figure 4:
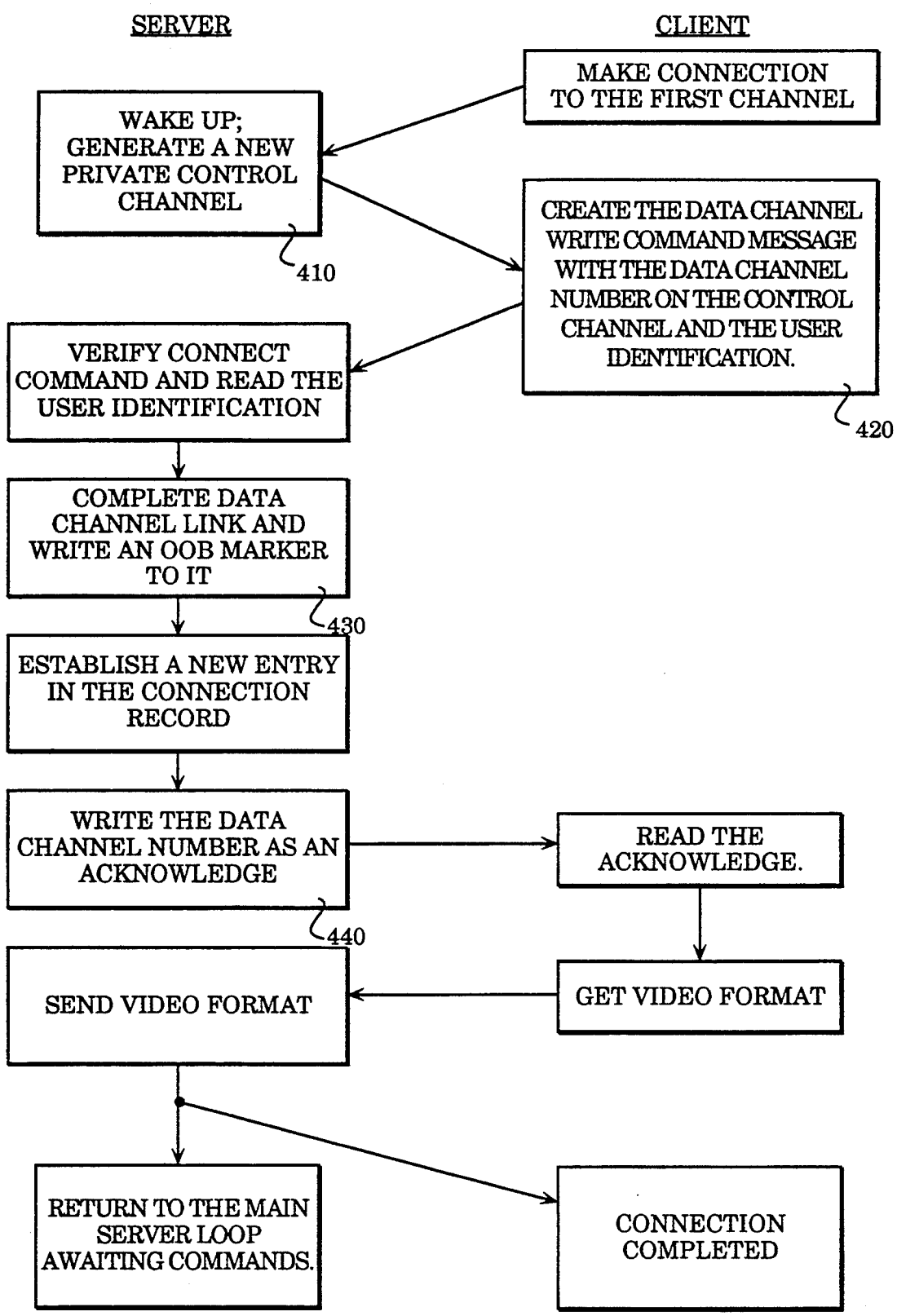
FIG. 4 is a diagram illustrating the process of connecting a client to the server.

Reference is now made to FIG. 4, where the process flow of connecting a client to the server is shown. The client process is started on a computer located in a remote location, and on the same network as the server. Preferably the client is run on a computer which provides a graphical user interface (GUI) that allows the user to enter the name of the computer running the video server and initiate a connection request by clicking a cursor control device such as a mouse button. The client then attempts to connect to the server through a default channel, which is well-known to the clients.

Upon receiving the request from the client, the server establishes a channel to generate a new private connection to the client 410. This private channel becomes the control channel for this client. Upon receiving a signal from the server identifying the control channel, the client creates the data channel and sends an identifier for the data channel, along with the identification of the client, to the server, through the control channel 420. The server completes the connection of the data channel and sends an "out of band" (OOB) marker to clear the data channel 430. Communication on the data channel is established when the server sends the client the identifier of the data channel 440. This establishes bi-directional data flow between the client and server through the data channel. At this point the client gets the video format and current hardware configuration from the server. The server adds the new client to its list of connections and allocates memory for image data to be transferred.

Figure 8:
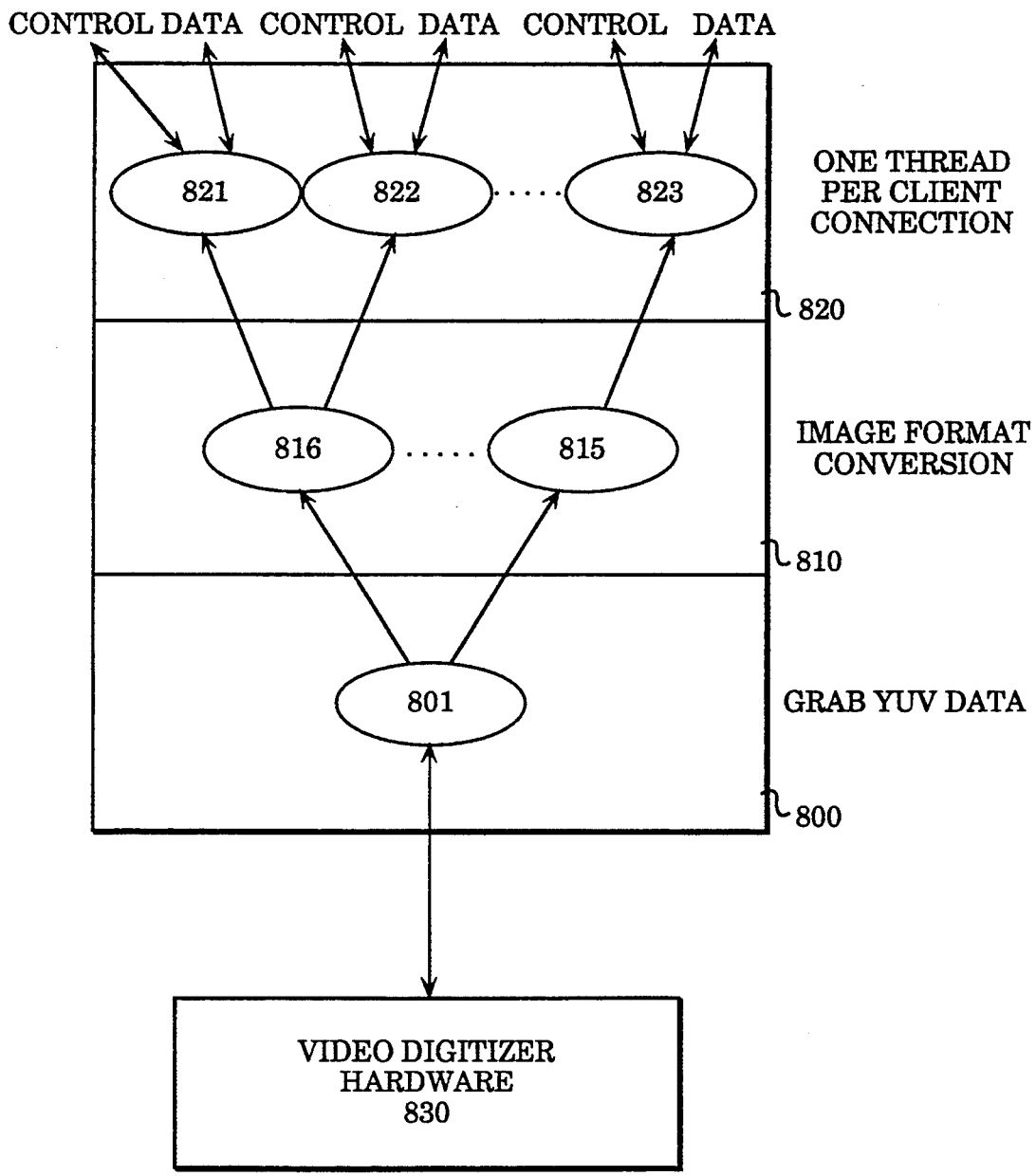
FIG. 8 is a schematic diagram of the multi-threaded video server application.

Once connected to the clients, the network video server can be described as a multi-threaded application with three layers as illustrated in FIG. 8. The bottom layer 800 is a single thread which when required, grabs an image 801 from the video digitizer hardware 830. With this one image, multiple threads can generate the various formats (815, 816) of displayable images, e.g. a thread for grayscale, a thread for 8-bit color, and a thread for 24-bit color. The top layer 820 is a thread (821, 822, 823) for each client connection using a data channel and a corresponding control channel. The client specifies the desired format of image data to the second layer 810. If the YUV data already exists, then the specified type of image is generated from the existing YUV data, otherwise the YUV "grab thread" runs before the second layer thread can return to the top layer client.

Figure 7:
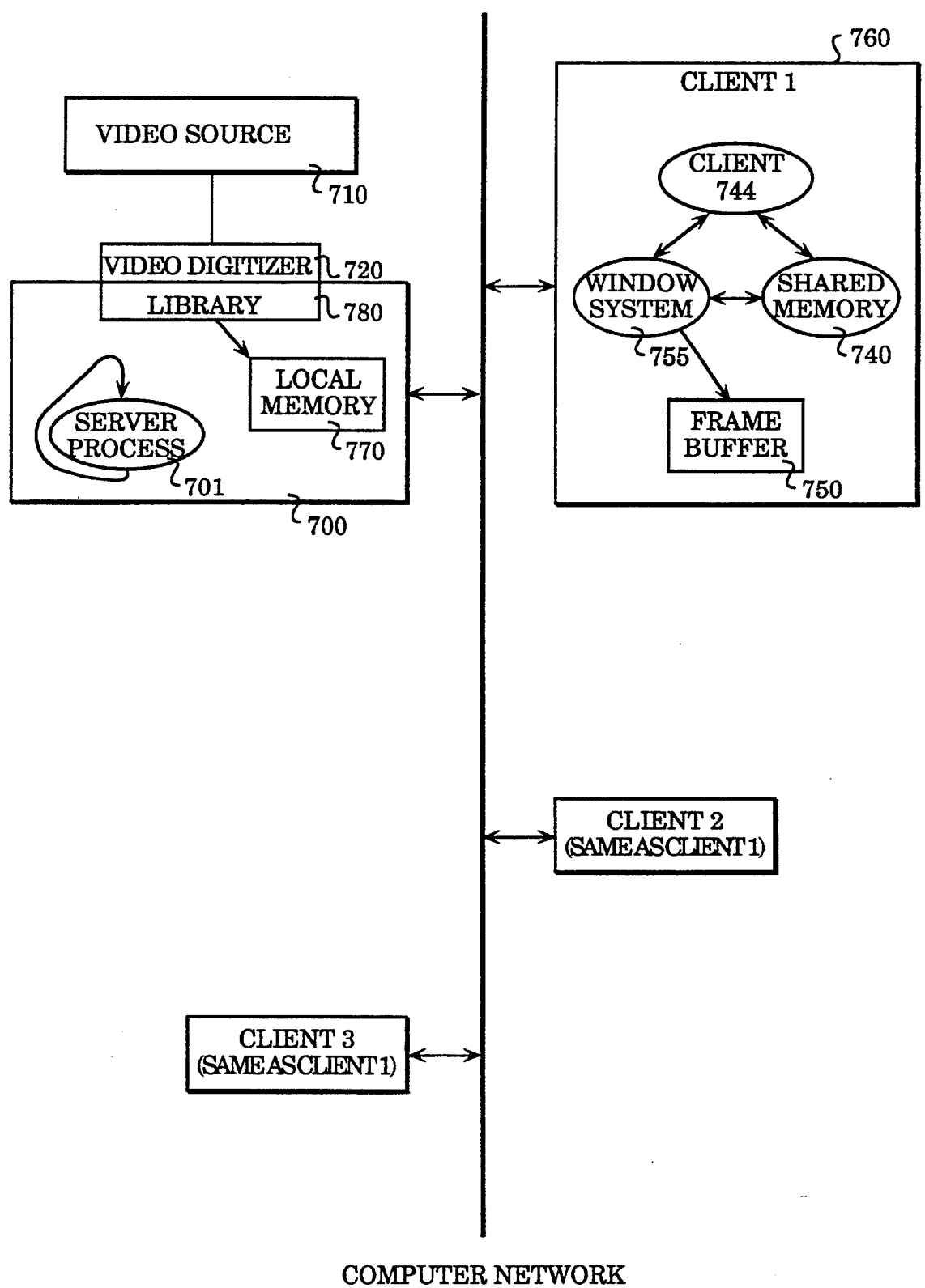
FIG. 7 is a block representation of data transfer among a server and multiple clients.

The following describes the process used to initiate the sending of a stream of video data from the server to the client, assuming that connection has been successfully made to the server. From the client's point of view the operation for starting and stopping a stream of video is the same irrespective of the number of the clients connected to the server. On the server's side a distinction is made between a single client and multiple clients. With reference to FIG. 7, data transfer begins with the client 760 selecting the format of image data to be used and to be transferred from the server 700 after the server process 701 extracts the image data from the video digitizer hardware 720. Image data in the selected format is asynchronously transferred from the server process 701 to the client 760 so that the server process 701 may attend to other clients before the first client completes its receipt of data. In single-client connection, the server process 701 takes the image data directly from the video digitizer hardware 720 and extracts the selected format of image data to be transferred to the client. Also, in multiple-client connection with all requested formats being the same, the server process 701 generates the image directly from the hardware 720. In multiple-client connection with possible multiple formats of image data selected, an optimization scheme is used. The server process 701 first stores the image data from the digitizer hardware 720 in an intermediary buffer (not shown) allocated by the server process 701, where different formats of image data can be derived subsequently. Also, once a format of image data is generated, this data is marked available so that if the same format is requested by another client, data can be readily duplicated and transferred to that client.

An exemplary operation of the current embodiment is described as follows with reference made to FIGS. 6 and 7. In the case of single-client connection, the client first tells the server through the SET_MODE command which preview format it wishes to use. The following formats are currently available.

| Format | Description |
| --- | --- |
| FULL_NTSC_BW | 640*480 Grayscale NTSC Video |
| FULL_PAL_BW | 768*575 Grayscale PAL video |
| HALF_BW | 360*240 grayscale |
| QUARTER_BW | 180*120 grayscale |
| FULL_COL | Square pixel image 8-bit color |
| HALF_COL | 360*240 8-bit color |
| QUARTER_COL | 180*120 8-bit color |
| FULL_MONO | Square pixel image monochrome |
| GRAB_YUV | Grab an image |

The particular format to be used is selected by the user of the client. Assume FULL_NTSC_BW is selected. This means that the client 760 wishes to see a 640*480 grayscale square pixel NTSC image. Having selected the format the client process 744 tells the server process 701 to initiate the flow of digital video images on the data channel. The server 701 first issues an OOB message on the data channel such that the client 744 can discard all the information on the data channel until the OOB message is detected, which synchronizes the server process 701 and client process 744. Since there is only one client 760 the server process 701 grabs the image data directly from the video digitizer hardware 720, extracts grayscale data directly from the image data on the video digitizer 720, and transfers the data to the client 760.

The client process 744 reads the video images from the data channel and assembles the video lines to form a complete image. As illustrated in FIG. 7 where only client 1 760 is connected, the image is stored in shared memory 740 before being written to the frame buffer 750 through the window system 755 of the client 1. Storing the image in shared memory 740 makes the time to transfer the image to the frame buffer 750 significantly faster than using a standard call to perform the operation because shared memory 740 can be accessed by both the client 744 and the window system 755. Until the data stream is stopped the client 760 will continuously display images from the server 700 as fast as it can receive them. The images would be displayed until the client provides a signal over the command channel to have the server cease transmitting the images. In an alternate embodiment, the control signal from the client to the server would be used by the client to request the server to change operative modes. In this embodiment, when the server was in a first operative mode, it would cease transferring digital video data to the client. However, when the server was in a second operative mode, it would retrieve another format of digital video data for the client.

Figure 6:
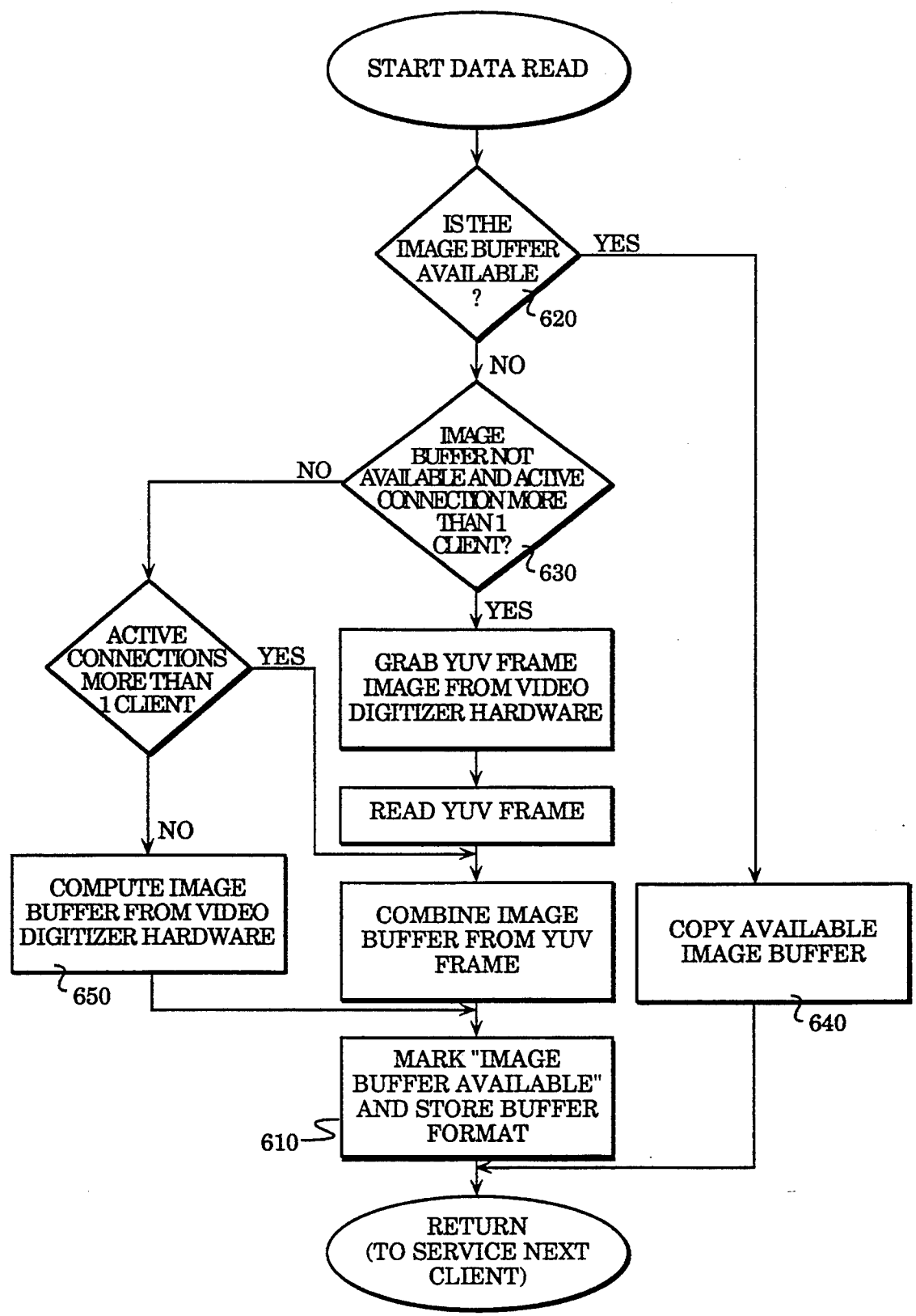
FIG. 6 is a flow chart diagramming the process of getting video data for a channel by the server.

Reference is now made to FIG. 6, where the process of sending video data to multiple clients is diagrammed. When there are multiple clients connected it is not necessarily true that they will all wish to receive the same modes of the video image data. In this case the server may read the image data from the video digitizer hardware and stores it in a local memory (FIG. 7, 770). All formats of the image can be derived from this image data in the local memory 770.

Assuming, for an example, that there are three clients connected to the server, and all have requested the server to transfer a stream of video images. Referring to FIG. 6, two of the clients wish to receive FULL_NTSC_BW images and the other client wishes to receive QUARTER_BW images. The server first captures an image from the incoming video source (FIG. 7, 710) and reads all of the YUV data through the video digitizer hardware (FIG. 7, 720). For the first client the field NTSC grayscale image is generated from the local memory (FIG. 7, 770) and the write is started for that client. The image buffer (not shown) written to the first client is marked "available" by the server 701 as having been generated for possible future reference. Using asynchronous I/O the server (FIG. 7, 701) now need not wait for the first write to finish before servicing to the next client. Since the second client in the sequence wishes to receive the QUARTER_BW image, the server (FIG. 7, 701) scans the previously calculated image buffers and determines that its desired image is not available and it must calculate the image from the YUV data before starting the write to the client. For the third client in this example the image requested has already been generated and the server can readily write to contents of the image buffer to the third client.

SET_HW and GET_HW are two exemplary commands which allow the client to set and get the video digitizer hardware through the server. Currently there are four variables that can be controlled: which input port to use; how to determine the format of the incoming video signal; the value of the hue control; and how to detect the color portion of the incoming video signal. The four current minor commands are listed below:

| Command | Function |
| --- | --- |
| HW_PORT | Change/get the current input port |
| HW_FORMAT | Change/get the method of detecting the format of the incoming video signal. |

| Command | Function |
| --- | --- |
| HW_HUE | Change/get the value of the hue offset control from 0. |
| HW_COLMOD | Change/get the method of detecting the color content of the incoming video signal. |

HW_PORT can have one of three values, which is passed to the server as the value of data in the command structure. Currently, the possible values are 1,2 or 3. "1" corresponds to the first RCA port, "2" the second RCA port, and "3" the S-Video port. HW_FORMAT allows the user to select between auto-detecting the video format or forcing it to be NTSC or PAL. The value selected is passed as the value of data. HW_HUE adjusts the value of the hue of the video signal from a nominal value. Offsets are in the range −20 to +20 degrees. The adjustment value is passed in the data value. HW_COLMOD determines the manner in which the color component of the video signal is to be detected. Three options are available. The option chosen is passed to the server in the data member of the command structure. AUTO asks the software to automatically determine the format; COLOR forces the hardware to look for a color component of the signal; and B&W forces the hardware to only detect the black and white (grayscale) component of the incoming video signal.

We claim:

1. In a data communication system comprising a plurality of computers coupled through a computer network, video acquisition unit coupled to a first computer ("server") for converting video image data from a video source into digital video data, said digital video data comprising at least one frame, a method for providing said digital video data to at least two other computers ("clients"), said method comprising the steps of:

a first client of said clients requesting active connection with said server by sending a first connection request to said server through a default communications channel;

upon receipt of said first connection request, said server responding by establishing a first control channel and a first data channel dedicated to said first client to communicate with said first client, said first control channel transferring first control requests and said first data channel transferring first data between said server and said first client;

said server monitoring said first control channel of said first client to determine if said first client is sending a first data request to said server;

said first client requesting data by issuing a first data request to said server through the first control channel, said first data request identifying a first format of digital video data to be transferred to said client;

upon receipt of said first data request, said server responding by;

(i) allocating a storage unit for storing a frame of said digital video data in said first format;

(ii) extracting said frame of said digital video data from said video acquisition unit;

(iii) converting said digital video data frame into said first format identified by said first client;

(iv) storing in said storage unit said digital video data frame which has been converted into said first format;

(v) transferring said digital video data frame which has been converted into said first format to said first client through said first data channel of said first client; and (vi) repeating steps (ii) through (v) until said first client issues a first control signal to said server through the first control channel of said first client, when a second client of said clients requests active connection with said server by sending a second connection request to said server through said default communications channel;

upon receipt of said second connection request, said server responding by establishing a second control channel and a second data channel dedicated to said second client to communicate with said second client, said second control channel transferring second control requests and said second data channel transferring second data between said server and said second client;

said server monitoring said second control channel of said second client to determine if said second client is sending a second data request to said server;

said second client requesting data by issuing a second data request to said server through the second control channel, said second data request identifying a second format of digital video data to be transferred to said second client;

upon receipt of said second data request, said server responding by;

(vii) comparing said first and said second formats and if said first and second formats are the same;

(viii) transferring said digital video data frame which has been converted into said first format from said first storage unit, to said second client through said second data channel of said second client; and (ix) repeating step (viii) until said first client issues said first control signal to said server through the first control channel of said first client or until said second client issues a second control signal to said server through the second control channel of said second client.

2. The method according to claim 1, wherein, if in step (vii), said first and second formats are not the same, said server skipping steps (viii and ix) and instead performing the following steps:

(x) allocating a second storage unit for storing said frame of said digital video data in said second format;

(xi) extracting said frame of said digital video data from said video acquisition unit;

(xii) converting said digital video data frame into said second format identified by said second client;

(xiii) storing in said second storage unit said digital video data frame which has been converted into said second format;

(xiv) transferring said digital video data frame which has been converted into said second format to said second client through said second data channel of said second client; and (xv) repeating steps (xi) through (xiv) until said second client issues said second control signal to said server through the second control channel of said second client.

3. The method according to claim 1, wherein if said client detects in step (ix) that said first client issued said first control signal to said server through the first control channel of said first client, said server performs the following steps:

(xvi) extracting said frame of said digital video data from said video acquisition unit;

(xvii) converting said digital video data frame into said second format identified by said second client;

(xviii) storing in said first storage unit said digital video data frame which has been converted into said second format;

(xix) transferring said digital video data frame which has been converted into said second format to said second client through said second data channel of said second client; and (xx) repeating steps (xvi) through (xix) until said second client issues said second control signal to said server through the second control channel of said second client.

4. The method according to claim 1, wherein said first control signal from said first client to said server requests said server to cease transferring said digital video data to said first client.

5. The method according to claim 1, wherein said second control signal from said second client to said server requests said server to cease transferring said digital video data to said second client.

6. In a data communication system comprising a plurality of computers coupled through a computer network, video acquisition means coupled to a first computer ("server") for converting video image data from a video source into digital video data, said digital video data comprising at least one frame, a method for providing said digital video data in a plurality of digital data formats to a plurality of other computers ("clients"), said method comprising the steps of:

each client requesting data by sending a connection request to said server through a default communications channel coupling between said network and said server;

upon receipt of the connection request, said server responding to each client by establishing a control channel and a corresponding data channel dedicated to each client, said control channel transferring control requests between said server and each client, said data channel transferring data between said server and each client;

said server monitoring each control channel to determine if any of said clients is sending control requests to said server;

each client requesting data by issuing a data request to said server through the control channel of the client, said data request identifying a format of said digital video data to be transferred to the client, there being a positive integer N where N is the number of requested distinct formats of said formats;

upon receipt of the data request from a client, said server responding by;

(i) determining whether a storage means has been allocated for the requested format, if no storage means has been allocated for the requested format, allocating a storage means for storing a frame converted to said format;

(ii) said server extracting a frame of said digital video data from said video acquisition means;

(iii) converting said frame of said digital video data into N frames where N is the number of the storage means currently allocated;

(iv) storing said N converted frames in said N respective storage means;

(v) for each of said N converted frames, transferring said converted frame to each of its respective requesting clients through said respective data channels of said respective requesting client; and (vi) repeating steps (ii) through (v) until one of said clients issues a control signal to said server through its respective control channel.

7. The method according to claim 6, wherein said computer system further comprises a computer ("new client") coupled to said network, said server already providing data to other clients through their respective control channels and data channels, said method further comprising the steps of:

said new client requesting data by sending its connection request to said server through a default channel;

said server responding by establishing a new control channel and a new data channel dedicated to said new client;

said server monitoring said new control channel to determine if said new channel is sending a data request to said server;

said new client issuing a data request to said server, said data request identifying a new client requested format of said digital video data to be transferred to said new client, said server responding by;

said server determining whether a frame of said digital video data in said new client requested format is available in said storage unit, said storage unit storing frames of said digital video data already converted to formats for other clients in active connection with said server, if available, said server skipping steps (i) through (iv) and performing steps (v) and (vi) for said new client, and if not available, said server performing steps (i) through (vi) for said new client, whereby digital video data of said format as specified by said new client is transferred to said new client.

8. A network video server system comprising:

a plurality of computer systems comprising a server and at least two client computers;

a computer network coupling the plurality of computer systems, said network comprising a default communication channel and at least two control and data channels, said clients used for sending a connection request through said default channel to said server, said server used for responding to said connection request by establishing a control channel and a data channel for said client issuing said connection request, said clients used for sending a data request to said server through said control channels and receiving data through said data channels such that said server can transfer a plurality of said digital video data to said clients concurrently;

video acquisition unit coupled to said server, said video acquisition unit for converting real time video image data from a video source into real time digital video data, said digital video data comprising at least one frame;

said server comprising;

control channel and data channel control units for establishing said control channel and a corresponding said data channel between said server and each of said clients, said control channel unit utilized for communications, said data channel unit utilized for transferring formatted frames of said digital video data, said server used for continuously checking said control channels for requests from any of said clients;

data format converting unit for converting said digital video data frame into a plurality of formats in response to requests from said clients, said data format converting unit only converting said digital data frame into said formats requested;

formatted data storage unit coupled to said data format converting unit for storing one copy per said requested format of said data frame converted into said requested format;

client connection unit coupled to said formatted data storage unit for transferring from said formatted data storage unit said data converted into said requested formats to said clients such that each said client which requested said data in a given format has said data transferred to it formatted into said given format.

9. The method according to claim 1, wherein said first control signal from said first client to said server requests said server to retrieve a third format of said digital video data.

10. The method according to claim 1, wherein said second control signal from said second client to said server requests said server to retrieve a fourth format of said digital video data.

* * * * *